United States Patent [19]

Rosen

[11] Patent Number: 4,612,546

[45] Date of Patent: Sep. 16, 1986

[54] SATELLITE COMMAND LINK PROTECTION SYSTEM

[75] Inventor: Harold A. Rosen, Santa Monica, Calif.

[73] Assignee: Hughes Aircraft Company, Los Angeles, Calif.

[21] Appl. No.: 373,766

[22] Filed: Apr. 30, 1982

[51] Int. Cl.[4] .............................................. H04B 7/185

[52] U.S. Cl. .................................... 343/352; 343/18 E

[58] Field of Search ............ 343/6.5 R, 6.5 LC, 18 E, 343/352, 354, 355, 6.5, 6.5 LL, 6.5 SS; 307/360, 362; 455/26, 27, 295, 230, 229; 340/825.5, 825.7, 825.71, 825.72, 825.77; 244/3.14; 318/16; 370/6; 361/182, 184, 187

[56] References Cited

U.S. PATENT DOCUMENTS

| | | | |
|---|---|---|---|
| 2,943,146 | 6/1960 | Thomas, Jr. | 361/182 X |
| 3,133,252 | 5/1964 | Skolnick et al. | 361/182 X |
| 3,299,358 | 1/1967 | Wood | 361/182 X |
| 3,385,978 | 5/1968 | Williard | 328/116 X |
| 3,438,037 | 4/1969 | Leland | 455/230 X |
| 4,241,450 | 12/1980 | Blatter et al. | 455/230 X |
| 4,349,916 | 9/1982 | Roeder | 370/6 X |
| 4,355,414 | 10/1982 | Inoue | 455/295 X |

*Primary Examiner*—Theodore M. Blum
*Assistant Examiner*—Gilberto Barrön, Jr.
*Attorney, Agent, or Firm*—W. J. Benman, Jr.; M. J. Meltzer; A. W. Karambelas

[57] ABSTRACT

The present invention provides an economical yet effective system for the protection of the command link of ground controlled beacon tracking satellites. The invention includes means for detecting the amplitude and/or phase modulation of a composite signal which results from the beating of an intruder's carrier signal with an uplink beacon. A bandpass filter is included for guaranteeing that the low frequency sweep of the beacon signal and the high frequency data communication signals are passed through the receiver without interference. The resulting output of the bandpass filter corresponds to the intruder's carrier. This signal is rectified to provide a DC signal. A first comparator is provided for comparing the output of the detector to a first threshold which gives an indication as to whether or not the intruder is attempting to saturate an intermediate frequency (IF) stage of the satellite's receiver. A second comparator is provided for comparing the above-identified DC signal to a second threshold. This comparator provides an output which represents the presence of an intruder signal which induces an amplitude or phase modulated composite signal in the preceeding IF amplifier. The comparator outputs are operatively connected to switching means for decoupling the satellite receiver from satellite control circuitry whenever the output of the detector means exceeds the first threshold or the output of the DC rectifier exceeds the second threshold. In effect, the system deactivates the ground base telemetry oriented control mechanism of the satellite whenever an intruder signal is detected which is within a predetermined power range of the beacon tracking signal (stealth) or nearing the saturation limits of the IF amplifier of the satellite receiver (power). This system is therefore effective in providing satellite command link protection against an intruder attempting to acquire control of the satellite by stealth or by power.

9 Claims, 9 Drawing Figures

SATELLITE COMMAND LINK PROTECTION SYSTEM

BACKGROUND OF THE INVENTION

1. Field of the Invention

This invention relates to satellite control systems. More specifically, this invention relates to systems which protect satellite control systems from unauthorized use.

While the present invention will be described herein with reference to a particular embodiment in a particular application, it is to be understood that the invention is not limited thereto. Those having access to the teachings of the present invention will recognize additional embodiments and applications within the scope thereof.

2. Description of the Prior Art

The utility of satellites in providing a reliable, economical and secure link in small and large scale communication systems has been clearly demonstrated. As reliance on satellite communications has grown, so has the concern for maintaining control or command of the satellite. Obviously, maintaining reliable communications may be vital to national interest. This has raised concern about the extent to which a satellite may be equipped with safeguards against unauthorized intrusion or interference with its command system.

Conventional methods for protecting ground controlled satellites from unauthorized acquisition include the use of a coded command. A coded command is a complicated stream of data bits which when properly encoded identifies to the satellite that the following sequence of command signals is emanating from a friendly operator. In this context, if the proper bit sequence or code is not received, the satellite will ignore the subsequent commands. For such a system, the required electronic phase synchronization equipment is not only costly, but also adds weight to the system. Such equipment may, for example, reduce the payload by as much as 28 pounds.

While this technique may be desirable for a military satellite system, it tends to be too costly and unnecessarily complicated for a commercial satellite system. Thus, there is a need for a simple command protection system that does not add significantly to the cost or weight of the satellite communication system. Such a system is easily incorporated into a satellite which already has a beacon tracking system as that described in Applicant's copending application entitled "Two-Axis Antenna Direction Control System"; Ser. No. 246,793; filed Mar. 23, 1981 (now issued as U.S. Pat. No. 4,418,350).

SUMMARY OF THE INVENTION

The present invention provides an economical yet effective system for the protection of the command link of ground controlled beacon tracking satellites. The invention includes means for detecting the amplitude and/or phase modulation of an composite signal which results from the beating of an intruder's carrier signal with an uplink beacon. A bandpass filter is included to insure that the low frequency sweep of the beacon signal and the high frequency data communication signals are passed through the receiver without interference. The output of the bandpass filter corresponds to the intruder's carrier. This signal is rectified to provide a DC signal. A first comparator is provided for comparing the output of the detector to a first threshold which gives an indication as to whether or not the intruder is attempting to saturate an IF (intermediate frequency) stage of the satellite's receiver. A second comparator is provided for comparing the DC signal to a second threshold. It provides an output which represents the presence of an intruder signal which induces an amplitude modulated composite signal in the preceeding IF amplifier. The comparator outputs are connected to switching means for decoupling the satellite receiver from satellite control circuitry whenever the output of the detector exceeds the first threshold or the output of the DC rectifier exceeds the second threshold.

The system deactivates the control mechanism of the satellite whenever an intruder signal is detected which is within a predetermined power range of the beacon tracking signal or nearing the saturation limits of the IF amplifier of the satellite receiver. This system is therefore effective in providing satellite command link protection against an intruder attempting to acquire control of the satellite by stealth or by power.

DETAILED DESCRIPTION OF THE INVENTION

Figure 1:
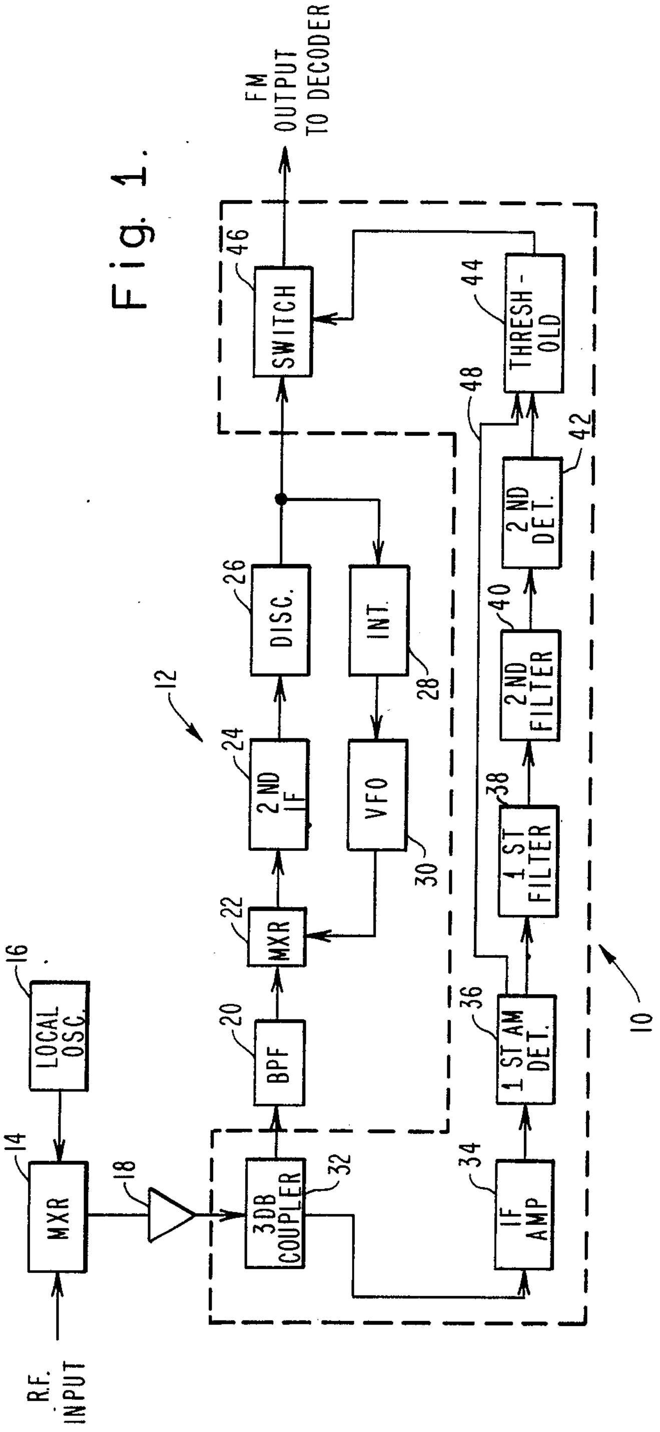
FIG. 1 is a system block diagram of an illustrative embodiment of the present invention.

The following description, when read in light of the above-identified drawings, will provide a more detailed understanding of the present invention. FIG. 1 shows an illustrative simplified block diagram representation of the command link protection system 10 of the present invention operatively connected with a typically satellite beacon tracking receiver 12.

The beacon tracking receiver 12 includes a mixer 14 which downconverts an RF signal received from an antenna (not shown) by beating it with the signal from the local oscillator 16. The downconverted IF signal is input to a stage of IF amplification including an IF preamplifier 18. The preamplified IF signal is input to a bandpass filter 20 through a 3 db coupler 32.

Assuming for now that there is no intruder signal present, the IF output of the bandpass filter 20 corresponds to the RF input carrier beacon. This IF representation of the beacon is input to a phase locked loop including a mixer 22, a second IF amplifier 24, a discriminator 26, an integrator 28 and a variable frequency oscillator 30. In the preferred embodiment, the beacon-track signal is a vertically polarized carrier which is linearly swept from 6419.5 MHz to 6424.5 MHz at a 100 Hz rate. Command signals, when present, are frequency modulated onto the slowly sweeping waveform. The phase locked loop allows the receiver 12 to track the beacon as it is swept over this range. When command signals are present in the beacon, they are passed as an FM output from the discriminator 26 through switch 46 to decoders (not shown). A beacon tracking system as typified at 12 in FIG. 1 is vulnerable to unauthorized acquisition by an intruder. The command protection system 10 of the present invention is effective to substantially mitigate this vulnerability.

The command link protection system 10 of the present invention shown within dashed lines in FIG. 1 has means for monitoring the incoming IF signal, detecting the presence of an intruder signal, and breaking the command link to the decoder thereby preventing the intruder from having access to the space craft control mechanism.

The invention 10 includes a 3 db coupler 32 of conventional design which splits the IF output of the preamplifier 18 into two paths, one for the beacon tracking circuitry and one for the intruder detection circuitry of the present invention 10. The 3 db coupler 32 thus provides an IF feed to IF amplifier 34 without otherwise significantly interfering with the operation of the beacon tracking system 12.

Figure 2A:
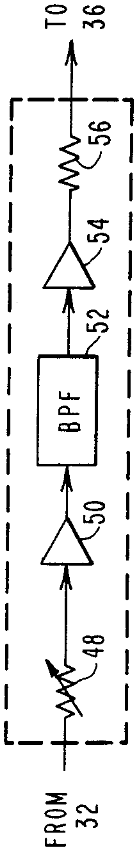
FIGS. 2(*a*), 2(*b*) and 2(*c*) are detailed schematic diagrams of the illustrative embodiment of the present invention.

The IF amplifier 34 is shown in greater detail in FIG. 2*a* as including a variable attenuator 48 for adaptation to diverse satellite systems. The IF amplifier 34 includes a low level amplifier 50. A bandpass filter 52 is provided to limit noise power. A second high level amplifier 54 is provided along with a 1 db pad to set the intruder signal level. The IF amplifier provides an input to detector filter circuitry including detectors 36 and 42, filters 38 and 40, threshold comparator 44 and switch 46. These elements are shown in greater detail in FIGS. 2*b* and 2*c*.

Figure 2B:
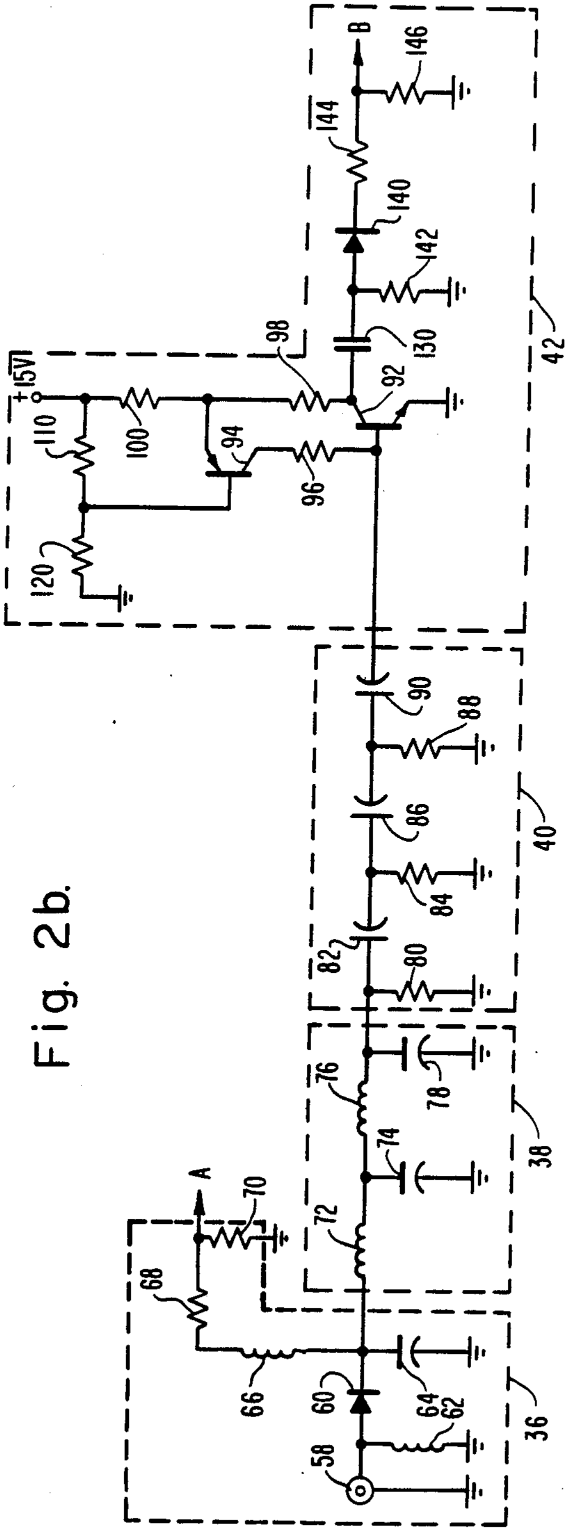
Figure 3A:
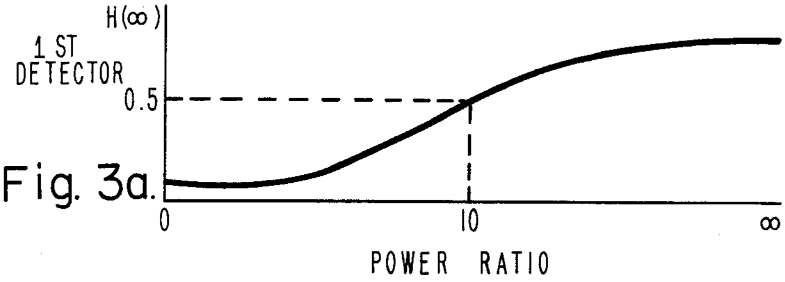
FIGS. 3(*a*) 3(*b*) and 3(*c*) 3(*d*) show the characteristics of selected subcircuits of the illustrative embodiment of the present invention.

In reference to FIG. 2*b*, the amplified IF signal which may or may not include the intruder signal is applied to the first AM detector 36 at 58. The first AM detector 36 includes a diode 60 connected between an inductor 62 and a capacitor 64. The inductor 62 provides a current return for the diode 60 without disturbing the IF input. The capacitor 64 serves a dual purpose in (1) facilitating AM detection in cooperation with the diode 60 by rectifying the received IF signal and (2) acting as a first stage in the filter 38. The characteristic of this first AM detector is shown in FIG. 3*a*. (Typical values for the components of the command link protection system 10 of the present invention are shown below in Table I.) The output of the detector 36 is fed forward to the threshold comparator 44 along path 48 through an inductor 66, a resistor 68 and another resistor 70. The inductor 66 acts as an RF choke and extracts the DC signal strength from the output of the detector 36. The resistors 68 and 70 reduce the DC signal to an appropriate level for threshold comparison in circuitry discussed more fully below.

Figure 3B:
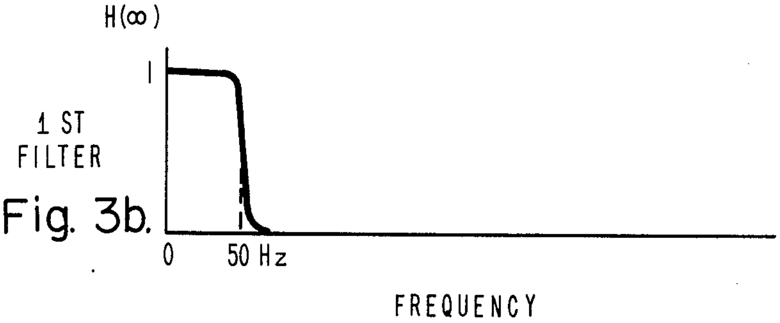

The output of the first detector 36 is filtered by first and second filter circuits 38 and 40. The first filter 38 is a low pass filter and the second filter 40 is a high pass filter. The low pass filter 38 includes two LC stages with inductors 72 and 76 and capacitors 74 and 78, respectively. The use of the parameters specified in Table I yields the low pass filter characteristic shown in FIG. 3*b*.

Figure 3C:
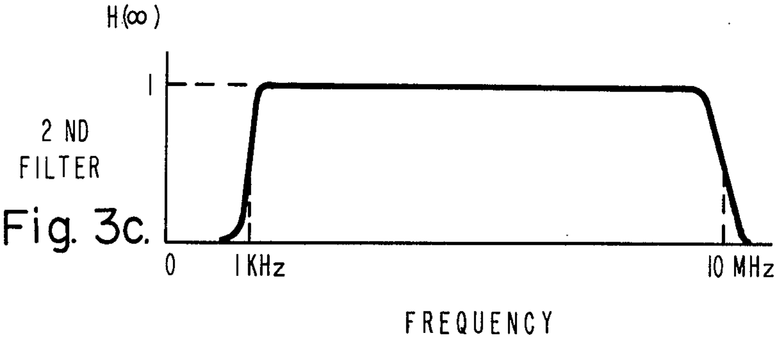
Figure 3D:
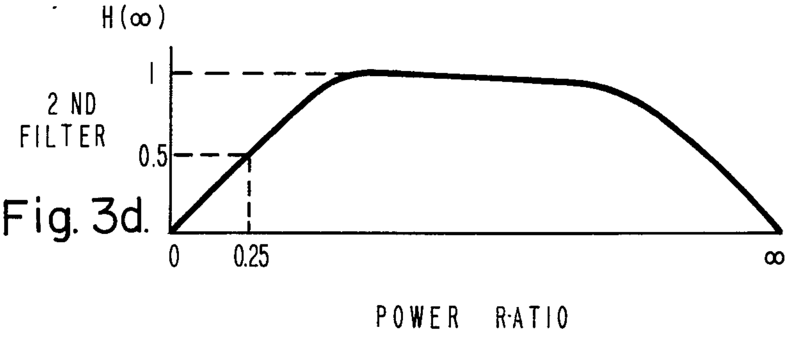

The high pass filter 40 includes a resistor 80, a capacitor 82, a second resistor 84, a second capacitor 86, a third resistor 88 and a third capacitor 90. Like the low pass filter, the high pass filter is of a conventional design. Use of the parameters specified in Table I yields the high pass filter characteristic shown in FIG. 3*c*.

The combination of the low pass filter 38 with the high pass filter 40 provides a bandpass filter which will not pass frequencies between 50 Hz and 1,000 Hz as well as those frequencies above 5 MHz. This filter characteristic was chosen to allow the 100 Hz sweep of the beacon signal to pass through the beacon tracking receiver 12 without activating the command link protection system 10. Likewise, the 5 MHz upper cutoff is chosen to allow the high frequency transponder signals to pass through the beacon tracking circuitry 12 without similarly activating the command link protection system 10.

The second AM detector 42 operates on the output of the filters 38 and 40. This second AM detector 42 effectively converts the filtered AM signal to a DC signal to facilitate threshold comparison. It includes a common emitter amplifier in an active bias configuration consisting of transistors 92 and 94 biased by resistors 96, 98, 100, 110 and 120. Capacitor 130 is provided for DC isolation and AC coupling. A diode 140 effectively rectifies the received signal with resistor 142 providing a current return for the diode 140. Resistors 144 and 146 provide a level setting voltage divider arrangement for threshold comparison at 44.

Figure 2C:
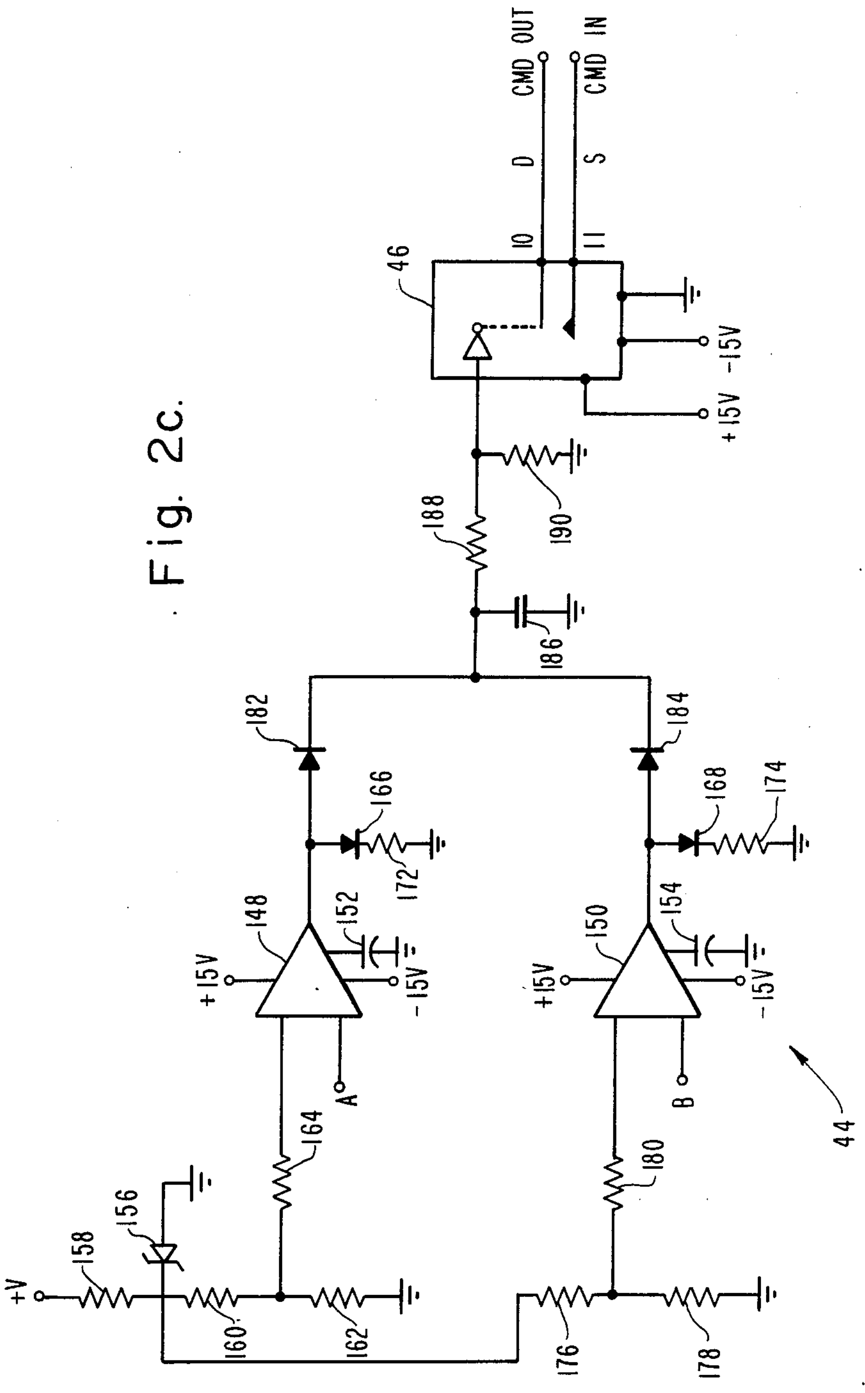

As shown in the detailed schematic of FIG. 2*c*, the threshold comparator 44 includes two appropriately biased operational amplifiers 148 and 150. Amplifier 148 includes a level setting network composed of a zener diode 156 and a voltage divider network of resistors 158, 160, 162 and 164. Using the component values specified in Table I, this network is effective to provide a 0.8 volt bias at the junction of resistors 162 and 164. This is sufficient to provide the presaturation signal strength threshold required by the command link protection system 10. The feedforward from the output of the first AM detector 36 at 'A' is input to the threshold comparator 44 at 'A'. As discussed more fully below, when the signal at 'A' exceeds this threshold, the output of the operational amplifier which is normally at a negative potential i.e., negative 15 volts, goes to a positive 15 volt level and activates an analog switch 46.

The second operational amplifier 150 has a detection threshold set by resistors 176, 178 and 180. When the component values of Table I are utilized here, a 0.2 volt comparison threshold is provided at the negative terminal of the operational amplifier 150. The output of the second detector 42 at 'B' is input to the threshold comparator 44 at 'B'. Whenever the signal level at 'B' exceeds 0.2 volts, the output of the operational amplifier 150 goes from $-15$ volts to $+15$ volts and activates the analog switch 46 thereby decoupling the command decoders (not shown) from the beacon track receiver 12. As discussed more fully below, the 0.8 threshold for amplifier 140 corresponds to a 50 DBM signal level and the 0.2 threshold for amplifier 150 corresponds to a $-6$ $DB_c$ threshold (6 dB below the carrier). The circuit of FIG. 2*c* also includes optional light emitting diodes 166 and 168 with appropriate biasing resistors 170 and 172, respectively. While the present invention comtemplates that these diodes will be useful to demonstrate when the command link protection system is activated in a stealth or power protection mode, it is recognized that these display devices may be replaced with other circuits to be actuated by intruder activity. Such a circuit may, for example, provide a signal to a ground station that an intruder has in fact attempted to acquire control of the spacecraft.

Diodes 182 and 184 pass a positve DC voltage to analog switch 46 via an RC network composed of a capacitor 186, a resistor 188 and a second resistor 190. This network is effective to not only bias the FET analog switch 46 but to also provide a fast-on slow-off operation for the switch 46 so that an intruder would be unable to circumvent the protection system by selectively activating the switch 46. The switch 46, is a standard FET analog switch such as that manufactured Siliconix, i.e., DG 129. As shown in FIG. *2c*, the signal from the discriminator to the decoders would be applied to terminals 10 and 11 or D and S of the DG 129 switch by Siliconix. Note that the characteristic of the second detector is shown in FIG. *3d*.

TABLE I

| Component | Specification | Component | Specification |
|---|---|---|---|
| Resistors | Ohms | Resistors | Ohms |
| 68 | 100K | 146 | 1 M |
| 70 | 1 M | 158 | 13K |
| 80 | 200 | 160 | 100K |
| 84 | 1K | 162 | 11K |
| 88 | 10K | 164 | 100K |
| 96 | 110K | 172 | 2.4K |
| 98 | 4.7K | 174 | 2.4K |
| 100 | 430 | 176 | 100K |
| 110 | 1K | 178 | 3K |
| 120 | 13K | 180 | 100K |
| 142 | 5.1K | 188 | 100K |
| 144 | 100K | 190 | 100K |
| Capacitors | Farads | Inductors | Henries |
| 64 | 82P | 62 | 3.3μ |
| 74 | 160P | 66 | 100μ |
| 78 | 82P | 72 | 5.6μ |
| 82 | 0.15μ | 76 | 5.6μ |
| 86 | 0.022μ | | |
| 90 | 1.0μ | | |
| 130 | 1.0μ | | |
| 152 | 100P | | |
| 154 | 100P | | |
| 186 | 0.047μ | | |
| Diodes | | Transistors | |
| 60 | IN5165 | 92 | 2N2222 |
| 140 | IN5165 | 94 | 2N2907 |
| 156 | 6.8v zener | | |
| 182 | IN3600 | | |
| 184 | IN3600 | | |
| Amplifiers | | | |
| 148 | LM 108 | | |
| 150 | LM 108 | | |

Figure 4:
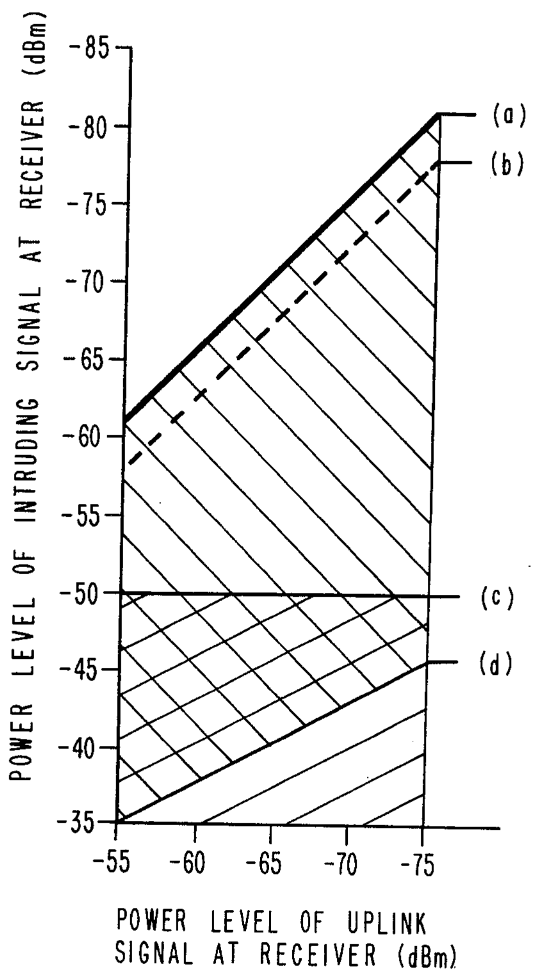
FIG. 4 is a system operational profile of an illustrative embodiment of the present invention.

The operation of the present invention 10 can now be explained with reference to the diagram of FIG. 4. FIG. 4 is a system operational profile with the shaded area denoting the regime in which the command protection system 10 will deactivate the receiver 12. The power level of the uplink signal at the receiver 12 is shown along the horizontal axis and the power level of the intruding signal at the receiver is shown on the vertical axis. In a communication satellite employing a beacon tracking system for antenna pointing control utilizing the present invention, the presence of a second carrier corresponding to the intruder would beat with the uplink beacon and create an amplitude and phase modulated composite signal in the IF amplifiers. As discussed above, the filters 38 and 40 ensure that the normal amplitude modulation of the tracking system is passed unaffected by the command link protection system 10. The other signals are effective to activate the switch either by the power saturation route or the stealth route through the threshold detector 44. The response time of the command link protection system is made short enough by the selection of the components in Table I, i.e., 3 milliseconds, to prevent a single bit of the command sequence from being processed by the decoders. In reference to FIG. 4, assuming the power level of the beacon is −75 dbm, the AM level detection amplifier 150 of the threshold comparator 144 activates the switch 46 and disables the receiver at point 'a'. Note that this corresponds to a level of 6 db which is ¼ the power of the beacon. The shaded area shown with back slanted lines below the 'a' curve indicates the area within which the AM signal detector at operational amplifier 150 will be activated. The 'b' curve shows the minimum level required to produce a 1.1 volt RMS signal in the decoders in a receiver 12 that is not protected by the command link protection system 10 of the present invention.

Curve 'd' corresponds to the level at which an intruder signal may saturate the command link protection system such that the AM signal detector circuitry becomes inoperative. However, at curve 'c' corresponding to −50 dbm the operational amplifier 148 is activated thus ensuring that the switch 46 is disabled as long as the intruder signal is present. The area underneath the 'c' curve is shaded with lines running normal to those corresponding to shading underneath the 'a' curve. The overlap between curves 'c' and 'd' ensures that the switch 46 will be activated by the operational amplifier 148 before the operational amplifier 150 becomes deactivated. The 'a' curve is slanted downward to correspond to an increase in that threshold level whenever the power level of the beacon at the receiver 10 increases in order to maintain the 6 db margin. However, the 'c' curve represents the fixed threshold of 50 dbm which holds regardless of the beacon strength. In normal operation, it is contemplated that the beacon will be centered around −65 dbm. It is expected that rain and other atmospheric disturbances may cause the strength of the beacon to fluctuate between −55 and −75 dbm. Nonetheless, the command link protection system will be designed to be effective throughout the anticipated power range.

While the present invention has been described herein with reference to a particular embodiment, it is to be understood that the invention is not limited thereto. Other filtering, detection, thresholding and switching circuits may be employed without departing from the scope of this invention. It is contemplated by the appended claims to cover any and all such modifications.

I claim:

1. A satellite command link protection system for use in combination with a satellite beacon tracking receiver and control means to preclude an intruder from acquiring control of a satellite comprising:

first means for detecting an AM signal and isolating said signal from a beacon;

bandpass filter means for limiting the AM signal to frequencies greater than any sweep rate of the beacon and less than any data communication frequencies to be received by said satellite receiver;

first comparator means for comparing the AM signal to a first threshold and to provide an output signal which represents the presence of an intruder signal with a predetermined signal strength;

second comparator means for comparing the filtered AM signal to a second threshold and to provide an output signal which represents the presence of an intruder signal which induces an amplitude or a phase modulated composite signal in the first means;

second means operatively connected to said first and second comparator means for decoupling said satellite receiver from said satellite control means whenever the output of said first means exceeds said first threshold or the output of said bandpass filter means exceeds said second predetermined threshold.

2. The command link protection system of claim 1 wherein said first means includes a demodulator.

3. The command link protection system of claim 1 wherein said bandpass filter means includes a low pass filter and a high pass filter.

4. The command link protection system of claim 1 wherein said first means includes means for converting the AM signal to a DC signal.

5. The command link protection system of claim 1, including means for activating said comparator means whenever the intruder signal exceeds a first threshold.

6. The command link protection system of claim 1, including means for activating said second comparator means whenever the intruder signal exceeds a second threshold.

7. The satellite command link protection system for use in combination with a satellite beacon tracking receiver and satellite control means to preclude an intruder from acquiring control of a satellite comprising:

first means for detecting an AM signal including means for converting the AM signal to a DC signal and isolating said signal from a beacon;

a bandpass filter means for filtering the detected AM signal;

first comparator means for comparing the DC signal to a first threshold and providing an output signal which represents the presence of an intruder signal;

second comparator means for comparing the filtered AM signal to a second threshold to provide an output signal which represents the presence of an intruder signal; and switch means operatively connected to said first and second comparator means for decoupling said satellite receiver from said satellite control means whenever the output of said first means exceeds said first threshold or the output of said bandpass filter means exceeds said second threshold.

8. A satellite command link protection system for use in combination with a satellite beacon tracking receiver and satellite control means to preclude an intruder from acquiring control of a satellite comprising:

first means for detecting an AM signal and isolating said signal from a beacon to provide a DC signal;

comparator means for comparing the DC signal to a first threshold to provide an output signal which represents the presence of an intruder signal of a predetermined signal strength; and switch means operatively connected to said comparator means for decoupling said satellite receiver from said satellite control means whenever the output of said first means exceeds a predetermined threshold.

9. A satellite command link protection system for use in combination with a satellite beacon tracking receiver and satellite control means to preclude an intruder from acquiring control of a satellite comprising:

first means for detecting an AM signal and isolating said signal from a beacon;

a bandpass filter operatively connected to said first means;

comparator means for comparing the output of said bandpass filter to a predetermined threshold to provide an output signal which represents the presence of an intruder signal which induces an ampitude or phase modulated composite signal in said first means; and switch means operatively connected to said comparator means for decoupling said satellite receiver from said satellite control means whenever the output of said bandpass filter exceeds said predetermined threshold.

* * * * *